(12) United States Patent
Aoki et al.

(10) Patent No.: US 9,804,315 B2
(45) Date of Patent: Oct. 31, 2017

(54) DISPLAY DEVICE

(71) Applicant: Japan Display Inc., Minato-ku (JP)

(72) Inventors: Yoshiro Aoki, Minato-ku (JP); Yasushi Kawata, Minato-ku (JP); Arichika Ishida, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 153 days.

(21) Appl. No.: 14/722,808

(22) Filed: May 27, 2015

(65) Prior Publication Data
US 2015/0362812 A1 Dec. 17, 2015

(30) Foreign Application Priority Data

Jun. 13, 2014 (JP) ................................ 2014-122466

(51) Int. Cl.
*F21V 8/00* (2006.01)
*G02F 1/1339* (2006.01)
*G02F 1/1345* (2006.01)

(52) U.S. Cl.
CPC .......... *G02B 6/0011* (2013.01); *G02F 1/1339* (2013.01); *G02F 1/13452* (2013.01)

(58) Field of Classification Search
CPC .. G02F 1/13452; G02F 1/1339; G02B 6/0011
See application file for complete search history.

(56) References Cited

U.S. PATENT DOCUMENTS

2007/0035473 A1* 2/2007 Yamazaki ........... G02F 1/13318
345/4

FOREIGN PATENT DOCUMENTS

JP 11-271794 10/1999

* cited by examiner

*Primary Examiner* — Elmito Breval
*Assistant Examiner* — Nathaniel Lee
(74) *Attorney, Agent, or Firm* — Oblon, McClelland, Maier & Neustadt, L.L.P.

(57) ABSTRACT

According to one embodiment, provided is a liquid crystal display device with a reduced size and little restriction for incorporation into other devices. The liquid crystal display device includes an array substrate that includes multiple thin film transistors for pixel driving. The liquid crystal display device also includes a counter substrate disposed in a manner opposed to the array substrate. The liquid crystal display device further includes an FPC arranged to transmit an external signal for driving of the thin film transistors. One of the array substrate and the counter substrate has an outline larger than that of the other, disposed on the display side, and includes a connecting portion at a position not opposed to the other on the side opposite to the display side. At least one end portion of the FPC is connected to the connecting portion, while the other end portion extends inward.

9 Claims, 6 Drawing Sheets

DISPLAY DEVICE

INCORPORATION BY REFERENCE

The present invention claims priority under 35 U.S.C. §119 to Japanese Patent Application No. 2014-122466 filed on Jun. 13, 2014. The content of the application is incorporated herein by reference in its entirety.

FIELD

An embodiment of the present invention relates to a display device in which a signal transmission member arranged to transmit an external signal for driving of a drive element is connected to a substrate.

BACKGROUND

As displays of mobile applications typified by, for example, smartphones, large-screen liquid crystal display devices have recently been spreading rapidly. Such displays employed in mobile devices have shown a trend toward large-screen and high-definition display in light of capacity of displayed information and screen visibility.

However, such mobile devices, which are mainly in the manner of being held and operated in an operator's hand, preferably have as small a size of the device itself as possible, resulting in that the peripheral area other than the display area (display surface) is required to have an area reduced as small as possible.

To meet this requirement, low-temperature polysilicon (LTPS) liquid crystal display devices in which a display area driving circuit is incorporated in the substrate have recently been increasingly employed, in which the peripheral area other than the display area has a significantly reduced area compared to amorphous silicon (a-Si) liquid crystal display devices that require many driving ICs to be provided outside the glass substrate, composing the mainstream of current mobile device displays.

On the other hand, display devices even using low-temperature polysilicon need input of a driving signal, which in turn requires an additional space for folding of a flexible printed circuit (FPC) board connected to a connecting portion and arranged to supply, for example, an external signal and a power supply voltage, in the connecting portion often set mainly closer to the lower side of the quadrilateral display area. That is, the flexible printed circuit board, which is used for connection with an interconnection formed on the array substrate, is usually required to be folded by 180 degrees on the back side in order to be connected with an external signal source existing on the back side of the substrate so as not to impact the display, resulting in an increase in the external signal interfacing area by the space required for folding.

In addition, the connecting portion of the flexible printed circuit board is exposed on the display side and it is therefore necessary to avoid interference between a protective glass and/or a touch panel glass, which are needed for incorporation into actual mobile application sets such as smartphones, and the connecting portion, placing many restrictions on, for example, the position, thickness, and design of the flexible printed circuit board.

DETAILED DESCRIPTION

Embodiments provide a display device including a first substrate that includes multiple drive elements for pixel driving. The display device also includes a second substrate disposed in a manner opposed to the first substrate. The display device further includes a signal transmission member arranged to transmit an external signal for driving of the drive elements. One of the first substrate and the second substrate has an outline larger than that of the other, is disposed on the display side, and includes a connecting portion at a position not opposed to the other on the side opposite to the display side. At least one end portion of the signal transmission member is connected to the connecting portion, while the other end portion extends inward.

An arrangement according to a first embodiment will hereinafter be described with reference to FIGS. 1 and 2.

Figure 1:
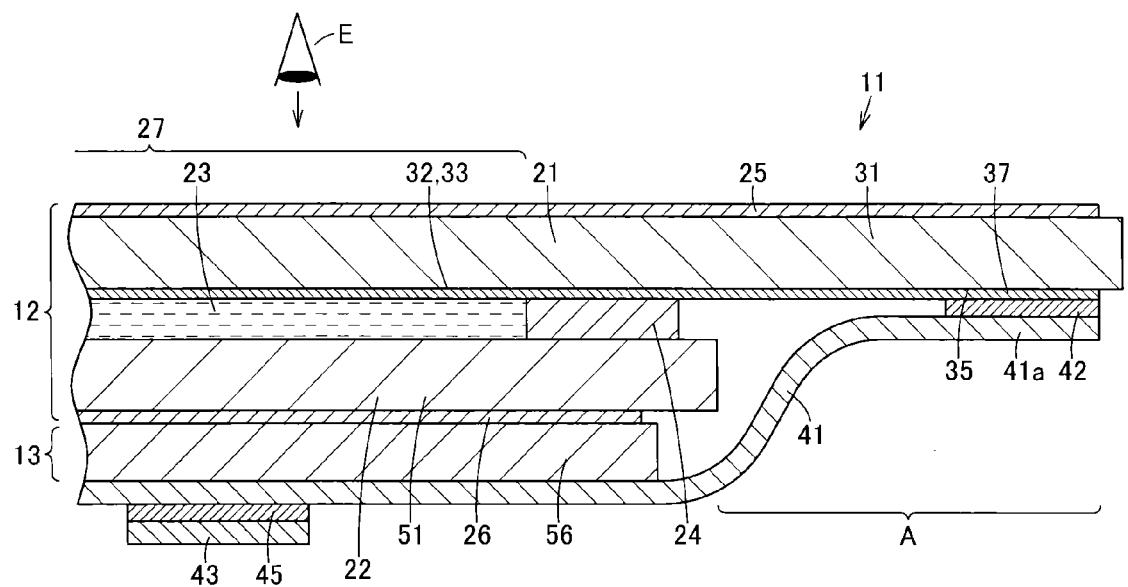
FIG. 1 is a cross-sectional view partially showing a display device according to a first embodiment.
Figure 2:
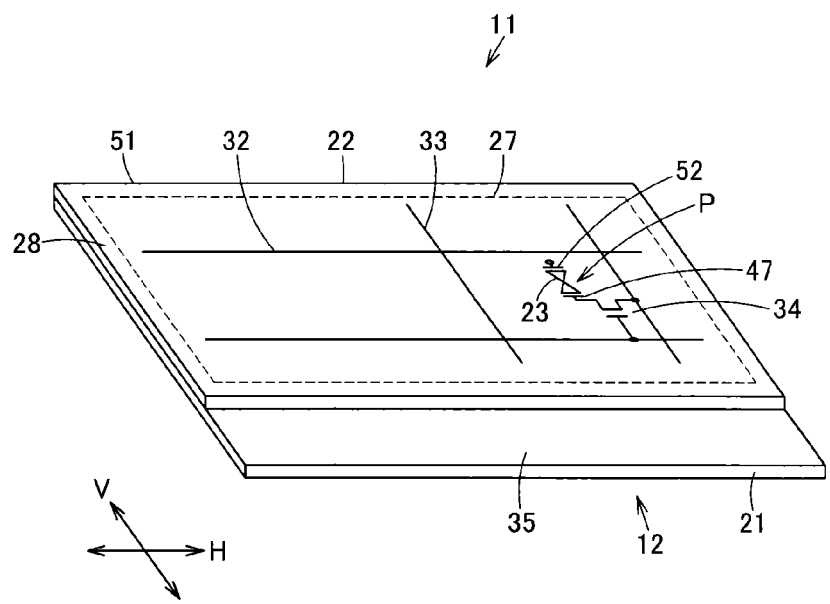
FIG. 2 is an illustrative view partially showing the display device.

In FIGS. 1 and 2, the reference numeral 11 denotes a liquid crystal display device serving as a display device. The liquid crystal display device 11 is used in various types of terminals such as cell-phones, smartphones, portable game consoles, personal computers, tablet PCs, and in-vehicle navigation display devices. The liquid crystal display device 11 then includes an LCD panel 12 being a display device main body and a backlight 13 being a planar light source device disposed on the back side of the LCD panel 12 and is disposed inside a chassis frame being a set chassis not shown. In addition, the following description is based on the definition that the display side (upper side in FIG. 1) of the LCD panel 12 is the front side, while the opposite side (lower side in FIG. 1) is the back side, that is, the rear side.

The LCD panel 12 is of a transmissive type in which planar light from the backlight 13 is transmitted to display an image, semi-transmissive type including a transmissive portion through which planar light from the backlight 13 is transmitted and a reflective portion at which incident light from the front is reflected, or a reflection/transmission combined type, and of an active matrix type. The LCD panel 12 then includes a quadrilateral array substrate 21 serving as a first substrate and a quadrilateral counter substrate 22 serving as a second substrate that are disposed in a mutually opposed manner with the array substrate 21 positioned in front and with a predetermined gap (cell gap) therebetween and, between the substrates 21 and 22, a liquid crystal layer 23 being an optical modulation layer and a spacer not shown arranged to maintain the gap between the substrates 21 and 22 are provided and the substrates 21 and 22 are bonded to each other via a sealing portion 24, and further polarizing plates 25 and 26 are attached, respectively, to the front side of the array substrate 21 and the rear side of the counter substrate 22. Secondary pixels P for image displaying are arranged in a matrix in the vertical (V) direction and the horizontal (H) direction to form a quadrilateral active area, that is, a display area 27 on which an image can be displayed. The quadrilateral frame-shaped portion of the entire liquid crystal display device 11 outside the display area 27 is a frame portion 28 being a peripheral area. In addition, on the display side of the LCD panel 12, a functional member such as a protective glass being a protecting member or a touch panel for touch input detection is bonded, though not shown.

The array substrate 21 has a transmissive glass substrate 31 being a first insulating substrate and, on a principal surface of the glass substrate 31 closer to the liquid crystal layer 23, a scanning line (gate interconnection) 32 and a signal line (source interconnection) 33 being multiple interconnections formed of a conductor such as a metal member in a thin film are arranged in a mutually insulated and grid-like manner approximately orthogonal to each other in a plan view. At the intersection between the scanning line 32 and the signal line 33, a thin film transistor (TFT) 34 for pixel driving being a drive element (switching element) is disposed, on which an orientation film not shown for orientation of liquid crystal molecules being display elements of the liquid crystal layer 23 is provided. In this embodiment, the array substrate 21 has an outline larger than that of the counter substrate 22 and, on the glass substrate 31, a non-opposed portion 35 is formed not opposed to the counter substrate 22, that is, provided in a manner protruding (extending) outward from an outer rim (outer edge portion) of the counter substrate 22.

The scanning line 32 and the signal line 33 are formed in the same process as part of the thin film transistor 34 and electrically connected with a connecting portion 37 including many pad electrodes and the like, one end portion of which is extracted onto the non-opposed portion 35. Accordingly, the connecting portion 37 is not opposed to the counter substrate 22 and positioned on the back side (rear side), which is opposite to the display side of the array substrate 21 (glass substrate 31). A flexible printed circuit board 41 (hereinafter abbreviated as FPC 41) serving as a signal transmission member is then electrically and mechanically connected to the connecting portion 37 via a thin film conductive member 42 such as an anisotropic conductive film (ACF) and, on the FPC 41, a drive circuit (driver) 43 for driving of each thin film transistor 34 (secondary pixel P) is mounted.

The FPC 41, which is also referred to as, for example, flexible tape, is formed of synthetic resin such as polyimide in a sheet thinner than the array substrate 21 and the counter substrate 22 and has flexibility. One end portion 41a of the FPC 41 is electrically and mechanically connected with the connecting portion 37 in the non-opposed portion 35, while the other end extends inward with respect to the outer rim (outer edge portion) of the array substrate 21 and is bent toward the rear side to be laid and fixed using, for example, a double-sided tape not shown onto the back side of the backlight 13 as well as electrically connected to an external signal source and a voltage source not shown. Accordingly, the portion of the non-opposed portion 35 of the array substrate 21 protruding outward from the counter substrate 22 and including the position at which the one end portion 41a of the FPC 41 and the connecting portion 37 are connected is an external signal interfacing area A.

The drive circuit 43 is electrically and mechanically connected to the other end side of the FPC 41, that is, a position spaced from the one end portion 41a via a thin film conductive member 45 such as an anisotropic conductive film (ACF).

Accordingly, the drive circuit 43 is electrically connected with the scanning line 32 and the signal line 33 via the FPC 41 and the connecting portion 37 as well as electrically connected to the external signal source and the voltage source via the FPC 41.

Each thin film transistor 34 is electrically connected, via its gate electrode being a control electrode, to the scanning line 32, electrically connected, via its source electrode being an input electrode, to the signal line 33, and electrically connected, via its drain electrode being an output electrode, to a transparent pixel electrode 47 forming each secondary pixel P. Each thin film transistor 34 can then undergo switching control when a signal from the drive circuit 43 is applied to the gate electrode via the scanning line 32 and can independently drive on/off each secondary pixel P by applying a voltage to the pixel electrode 47 correspondingly to a signal input from the drive circuit 43 via the signal line 33.

On the other hand, the counter substrate 22 includes, for example, a transmissive glass substrate 51 being a second insulating substrate, a counter electrode 52 being a common electrode formed on the glass substrate 51, and a color filter layer and an orientation film not shown. The counter substrate 22 is thus basically formed with no metal interconnection or the like. In addition, the counter electrode 52 may be formed on the array substrate 21 depending on the mode of the liquid crystal layer 23. The color filter layer may also be formed on the array substrate 21.

The liquid crystal layer 23 can employ various types of modes such as TN mode, STN mode, VA (MVA) mode, and IPS mode.

The sealing portion 24 is provided to bond the substrates 21 and 22 to each other and thereby seal the liquid crystal layer 23 between the substrates 21 and 22 and is formed through curing of, for example, ultraviolet (UV) curable resin or thermosetting resin in an annular shape surrounding the display area 27 (liquid crystal layer 23).

The polarizing plates 25 and 26 are optical members formed in a sheet and arranged to selectively transmit or block a predetermined polarization component according to the mode of the liquid crystal layer 23.

The backlight 13 includes a light source not shown, a quadrilateral plate-like light guide plate 56 being a light guide body arranged to convert light from the light source into planar light, multiple optical sheets not shown disposed in a laminated manner in front of the light guide plate 56 to reduce light distribution unevenness, and a reflecting sheet not shown disposed in a laminated manner in the rear of the light guide plate 56, the backlight 13 arranged to irradiate the rear side of the LCD panel 12 with planar light.

The light source employs, for example, a light emitting diode (LED) and is disposed in a manner opposed to one end of the light guide plate 56.

The light guide plate 56 is disposed in an opposed manner in the rear of the LCD panel 12. One end of the light guide plate 56 opposed to the light source is an incident surface for incidence of light therethrough from the light source. The front principal surface (one principal surface) of the light guide plate 56, which is opposed to the rear side of the LCD panel 12, is an outgoing surface through which light goes out, and the rear principal surface (the other principal surface), which is opposite to the outgoing surface, is a refractive surface at which light is reflected (refracted). The outer edge portion of the light guide plate 56 then extends outside of the outer edge portions of the display area 27 and the LCD panel 12 so that at least the area corresponding to the entire display area 27 of the LCD panel 12 can be irradiated with planar light, whereby the outgoing surface (and the refractive surface) has an area larger than that of the display area 27 and the LCD panel 12.

Next will be described a manufacturing method according to the first embodiment.

First, an array substrate 21 and a counter substrate 22 are manufactured separately.

The array substrate 21 is formed with a scanning line 32, a signal line 33, a thin film transistor 34, and a connecting portion 37 through repeated film formation and patterning on a glass substrate 31, and an orientation film is formed in a manner covering the scanning line 32, the signal line 33, the thin film transistor 34, and the connecting portion 37.

Similarly, the counter substrate 22 is formed with a counter electrode 52 and a color filter layer through repeated film formation and patterning on a glass substrate 51, and an orientation film is formed in a manner covering the counter electrode 52 and the color filter layer.

Next, the array substrate 21 and the counter substrate 22 are bonded to each other through curing of a fluidic sealing portion 24 applied, and thus a liquid crystal layer 23 is sealed between the substrates 21 and 22. In addition, any procedure such as a one-drop-fill (ODF) method or a vacuum injection method can be used for filling of the liquid crystal layer 23.

Thereafter, one end portion 41a of an FPC 41 on which a drive circuit 43 has preliminarily been mounted via a conductive member 45 is electrically and mechanically connected by, for example, thermocompression bonding to the connecting portion 37 of the array substrate 21 via a conductive member 42. Upon this, the FPC 41 is connected to the connecting portion 37 such that the other end overlaps the central portion of the array substrate 21 and the one end portion 41a does not protrude from the outer edge portion of the array substrate 21 (glass substrate 31).

Further, polarizing plates 25 and 26 are bonded, respectively, to the array substrate 21 and the counter substrate 22 to complete an LCD panel 12.

The LCD panel 12 is then laid on a separately assembled backlight 13 with the counter substrate 22 side therebetween, and the other end side of the FPC 41 is bent and fixed to the back side of the LCD panel 12 and the like using, for example, a double-sided tape.

Thereafter, a functional member such as a protective glass or a touch panel is appropriately applied to the display side of the LCD panel 12, on the array substrate 21 (polarizing plate 25) in this embodiment, using, for example, transparent synthetic resin or a double-sided tape to be housed in a chassis frame.

An external signal source or a voltage source is appropriately and electrically connected to the other end side of the FPC 41.

In the thus completed liquid crystal display device 11, liquid crystal molecules are driven at the position of each secondary pixel P by the thin film transistor 34 driven according to a signal from, for example, the external signal source so that the amount of light transmission from the backlight 13 through each secondary pixel P is controlled and the light through each secondary pixel P colored by the color filter layer causes an image to be displayed in the display area 27, which image is then recognized by user's eyes E.

As described heretofore, in accordance with the first embodiment, since the array substrate 21 with the outline larger than that of the counter substrate 22 is disposed on the display side and the one end portion 41a of the FPC 41 is connected to the connecting portion 37, which is provided in the non-opposed portion 35 of the array substrate 21 not opposed to the counter substrate 22, with the other end extending inward of the array substrate 21, it is possible to easily form a structure in which the FPC 41 does not protrude outward from the LCD panel 12 (array substrate 21) only by changing the direction of connection of the one end portion 41a of the FPC 41 to the connecting portion 37 without significantly changing the design of the array substrate 21 and the counter substrate 22 than before.

In addition, since the connecting portion 37 has an interconnection structure integrated with the scanning line 32 and the signal line 33, which are formed in the same process as part (gate electrode, source electrode, and drain electrode) of the thin film transistor 34, no additional process of forming the connecting portion 37 is needed, resulting in a further improvement in productivity.

Figure 3:
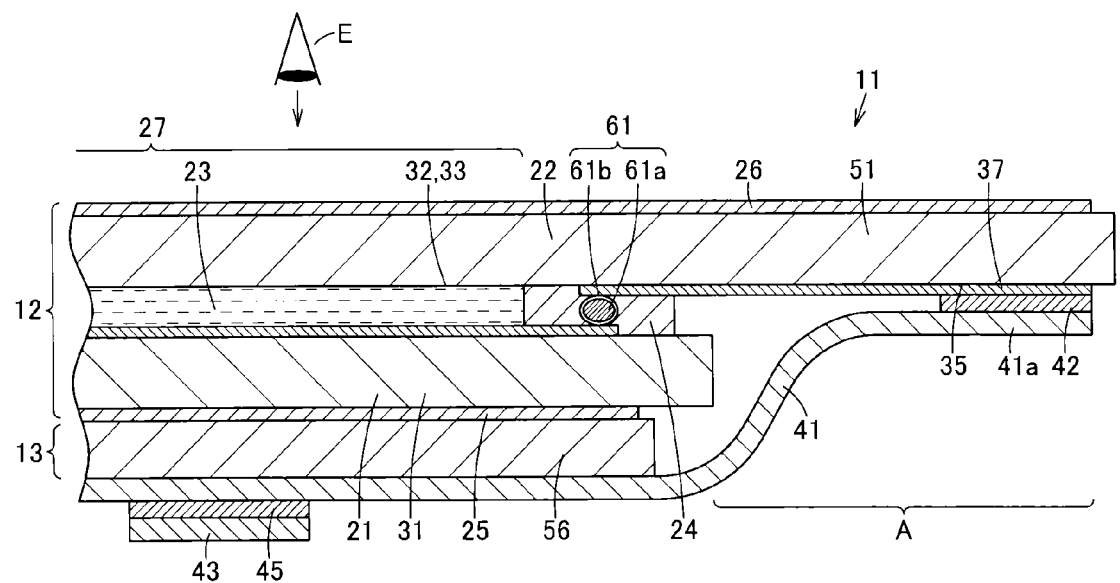
FIG. 3 is a cross-sectional view partially showing a display device according to a second embodiment.

Next will be described a second embodiment with reference to FIG. 3. In addition, arrangements and operations identical to those in the first embodiment are designated by the same reference numerals to omit description thereof.

In the second embodiment, the first embodiment is modified such that the counter substrate 22 has an outline larger than that of the array substrate 21 and is disposed on the display side, while the array substrate 21 is disposed on the back side.

That is, the non-opposed portion 35 is a portion of the counter substrate 22 (glass substrate 51) not opposed to the array substrate 21 and provided in a manner protruding (extending) outward from an outer rim (outer edge portion) of the array substrate 21, and the connecting portion 37 is provided in the non-opposed portion 35. Accordingly, the connecting portion 37 is positioned in the frame portion 28 outside the display area 27, and the portion of the non-opposed portion 35 of the counter substrate 22 protruding outward from the array substrate 21 and including the position at which the one end portion 41a of the FPC 41 and the connecting portion 37 are connected is an external signal interfacing area A.

Also, the scanning line 32 and the signal line 33 of the array substrate 21 are electrically connected with the connecting portion 37 of the counter substrate 22 directly through many signal interfacing units 61 introduced in the sealing portion 24 or indirectly through a signal line driver circuit and/or a scanning line driver circuit formed on the array substrate 21.

The signal interfacing units 61 each have a spherical shape in which a conductive layer 61b of, for example, gold (Au) is evaporatively deposited on the surface of a spherical body (pearl) 61a being a synthetic resin support, and the portion of the sealing portion 24 in which the signal interfacing units 61 are introduced is an anisotropic conductive member having conductivity only in the front-back direction. The signal interfacing units 61 are each formed to have a size approximately equal to that of, for example, the spacer arranged to maintain the gap between the substrates 21 and 22, and sandwiched in the front-back direction between the array substrate 21 and the counter substrate 22 to maintain the gap as well as arranged to electrically and mechanically connect the scanning line 32 and the signal line 33 with the connecting portion 37.

During manufacture of the liquid crystal display device (LCD panel 12), many signal interfacing units 61 are introduced into the sealing portion 24 at the site of connection of the scanning line 32 and the signal line 33 with the connecting portion 37 when the array substrate 21 and the counter substrate 22 are bonded, whereby an external force is applied to bond the array substrate 21 and the counter substrate 22 and slightly press and deform the sealing portion 24, and the sealing portion 24 is caused to cure with the scanning line 32 and the signal line 33 being electrically connected, in the front-back direction, with the connecting portion 37 via the signal interfacing units 61.

Since the counter substrate 22 with the outline larger than that of the array substrate 21 is thus disposed on the display side and the connecting portion 37, which is provided in the non-opposed portion 35 of the counter substrate 22 not opposed to the array substrate 21, is electrically connected with the scanning line 32 and the signal line 33 of the array substrate 21 via the signal interfacing units 61, and the one end portion 41a of the FPC 41 is connected to the connecting portion 37 with the other end extending inward of the counter substrate 22, thereby the counter substrate 22 can be positioned on the display side, which basically has no metal interconnection or the like in the display area 27 that would reflect light from the backlight 13 through the liquid crystal layer 23 of the LCD panel 12, whereby it is possible to eliminate the influence of unnecessary reflection at such an interconnection, resulting in a further improvement in display quality.

Figure 4:
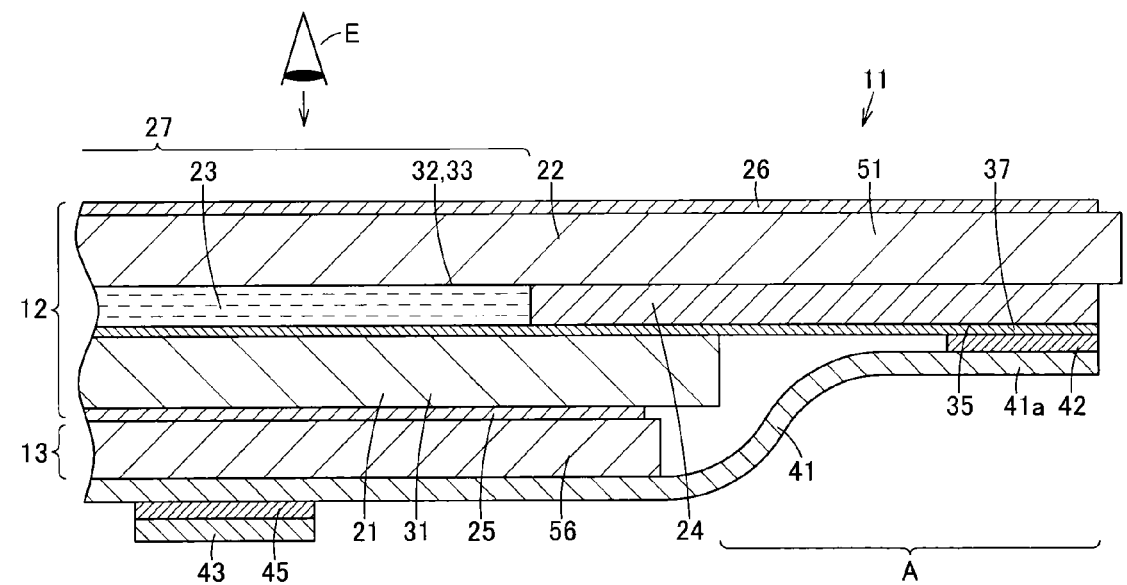
FIG. 4 is a cross-sectional view partially showing a display device according to a third embodiment.

Next will be described a third embodiment with reference to FIG. 4. In addition, arrangements and operations identical to those in the above-described embodiments are designated by the same reference numerals to omit description thereof.

In the third embodiment, the second embodiment is modified such that the connecting portion 37 extends outward of the array substrate 21 together with the sealing portion 24 and is fixed at the position of the non-opposed portion 35 of the counter substrate 22 via the sealing portion 24 in an exposed manner.

The connecting portion 37 is formed by forming a film on, for example, the glass substrate 31 of the array substrate 21 via a predetermined peeling layer, bonding the array substrate 21 and the counter substrate 22 via the sealing portion 24 in a manner covering the connecting portion 37, and then partially peeling off the glass substrate 31.

Since the connecting portion 37 once formed on the array substrate 21 is thus fixed to the non-opposed portion 35 of the counter substrate 22 via the sealing portion 24 by peeling off the glass substrate 31 of the array substrate 21, no arrangement is needed for preliminarily providing a connecting portion on the counter substrate 22 and electrically connecting with the scanning line 32 and the signal line 33 on the array substrate 21, whereby it is possible to manufacture the liquid crystal display device 11 more easily.

Figure 5:
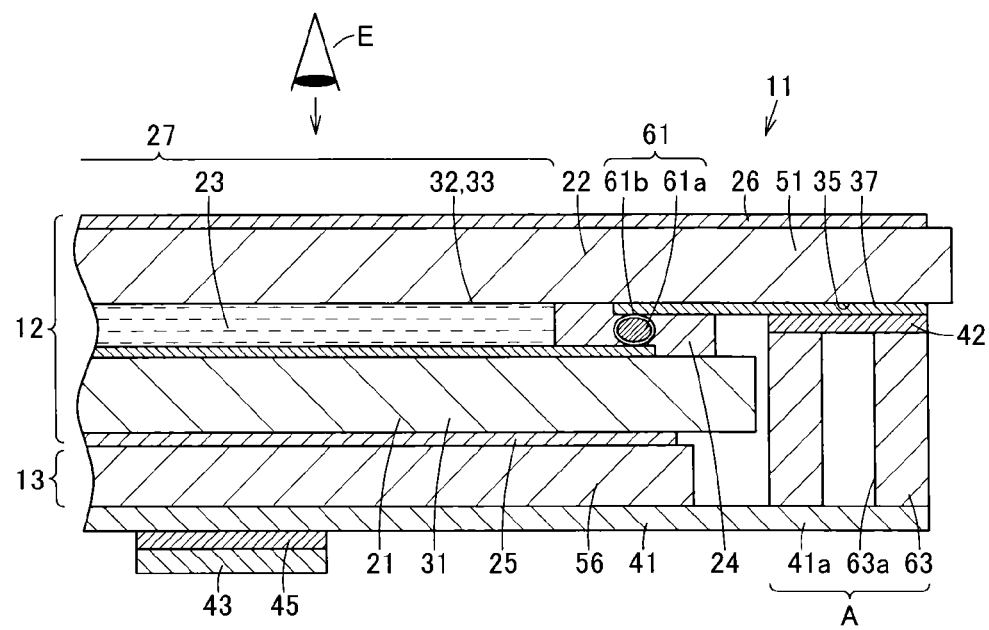
FIG. 5 is a cross-sectional view partially showing a display device according to a fourth embodiment.

Next will be described a fourth embodiment with reference to FIG. 5. In addition, arrangements and operations identical to those in the above-described embodiments are designated by the same reference numerals to omit description thereof.

In the fourth embodiment, the second embodiment is modified such that the FPC 41 is electrically and mechanically connected with the connecting portion 37 on the counter substrate 22 via a printed circuit board 63 (hereinafter abbreviated as PCB 63) serving as a connecting member.

The PCB 63 is, for example, a multilayer substrate and includes a via hole 63a for electrical interlayer connection along the normal direction (front-back direction) of the substrates 21 and 22 being the thickness direction. The PCB 63 is also formed to have a thickness approximately equal to the total thickness of the array substrate 21 and the backlight 13, the front side thereof electrically and mechanically connected with the connecting portion 37 via the conductive member 42 at a position close to the array substrate 21 (glass substrate 31), while the rear side thereof electrically and mechanically connected to the one end portion 41a of the FPC 41 on the surface opposite to the drive circuit 43. The PCB thus electrically connects the connecting portion 37 (scanning line 32 and signal line 33) and the drive circuit 43 via the via hole 63a. The PCB 63 is also formed to be elongated along the non-opposed portion 35.

Since the PCB 63 for signal transmission between the connecting portion 37 and the FPC 41 is provided between the connecting portion 37 and the one end portion 41a of the FPC 41 along the normal direction of the substrates 21 and 22, the FPC 41 can be disposed in an approximately flat manner, so that no space is needed for bending of the FPC 41 as in the case where the one end portion 41a of the FPC 41 is connected directly to the counter substrate 22, whereby it is possible to reduce the size of the connecting portion 37 (non-opposed portion 35).

In addition, the liquid crystal display device 11, which is of a transmissive, semi-transmissive, or reflection/transmission combined type in the first to fourth embodiments, may be of a reflective type including no backlight 13 with the same configuration.

Figure 6:
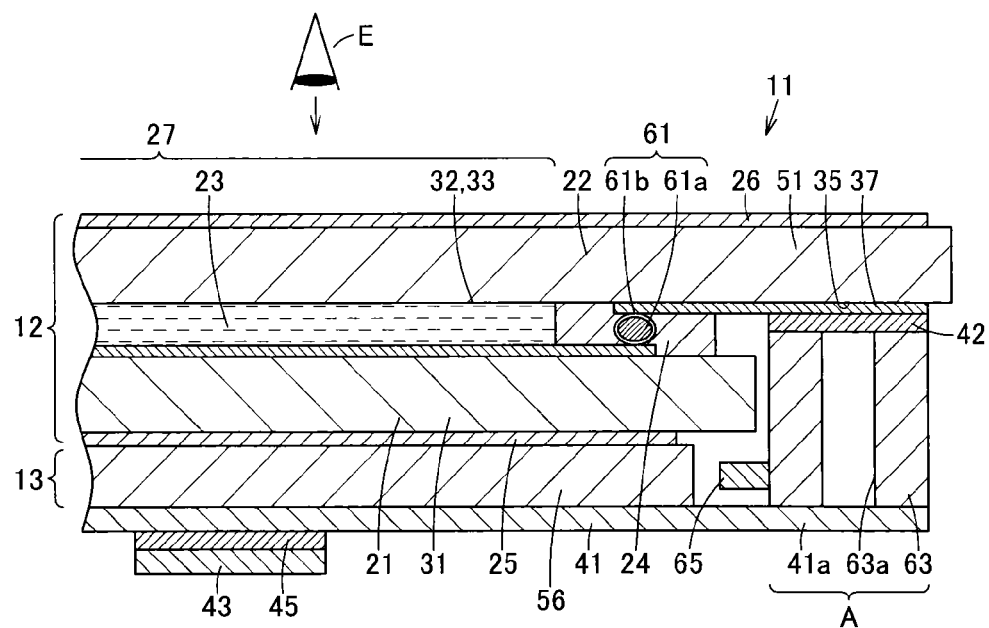
FIG. 6 is a cross-sectional view partially showing a display device according to a fifth embodiment.

Next will be described a fifth embodiment with reference to FIG. 6. In addition, arrangements and operations identical to those in the above-described embodiments are designated by the same reference numerals to omit description thereof.

In the fifth embodiment, the fourth embodiment is modified such that a light source 65 for the backlight 13 is mounted lateral to the PCB 63.

The light source 65 is, for example, an LED and disposed on a side surface of the PCB 63 in a manner opposed to the incident surface of the light guide plate 56. The light source 65 is electrically connected with an interconnection inside the PCB 63 and arranged to be turn-on controlled by an external turn-on circuit not shown mounted on the PCB 63 or the FPC 41 or electrically connected with the FPC 41.

Since the light source 65 is thus disposed on the PCB 63, the number of components can be reduced compared to the case where a light source, a control circuit for turning on the light source, etc., are configured separately, resulting in a further reduction in production cost.

Figure 7:
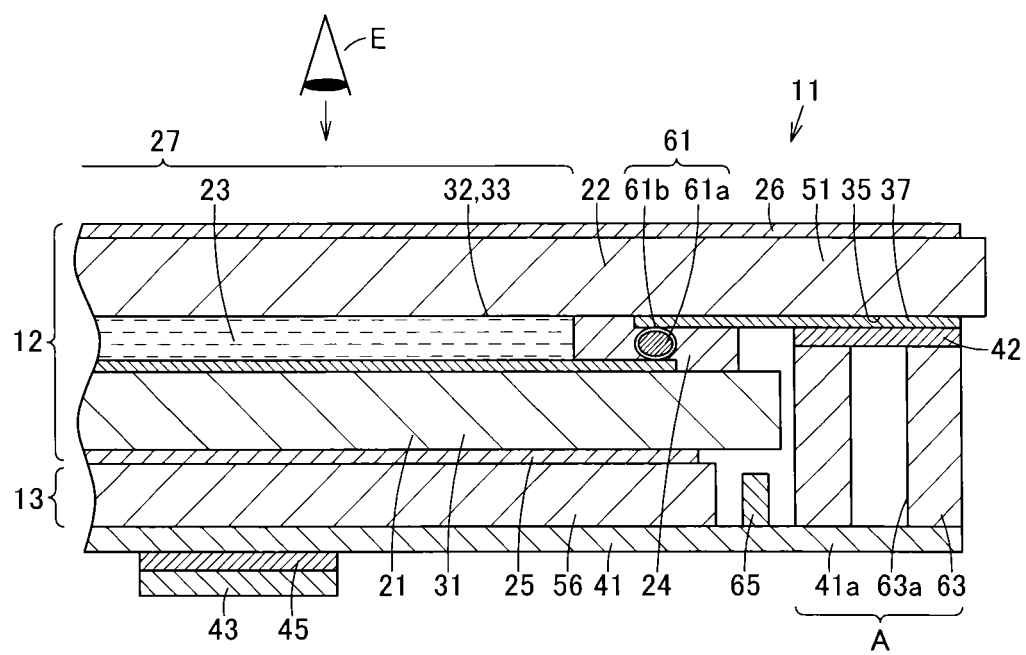
FIG. 7 is a cross-sectional view partially showing a display device according to a sixth embodiment.

Next will be described a sixth embodiment with reference to FIG. 7. In addition, arrangements and operations identical to those in the above-described embodiments are designated by the same reference numerals to omit description thereof.

In the sixth embodiment, the fifth embodiment is modified such that the light source 65 is mounted on the surface of the FPC 41 opposite to the drive circuit 43. In this state, the FPC 41 is disposed in a manner opposed to the incident surface of the light guide plate 56. The light source 65 is also arranged to be turn-on controlled by an external turn-on circuit not shown mounted on the FPC 41 or electrically connected with the FPC 41.

Thus being disposed on the FPC 41, the light source 65 can be disposed easily even if it may not be easy to dispose the light source 65 integrally on, for example, the PCB 63, whereby the number of components can be reduced compared to the case where a light source, a control circuit for turning on the light source, etc., are configured separately, resulting in a further reduction in production cost.

In addition, the structure in which the light source 65 is mounted on the FPC 41 as in the sixth embodiment can also be applied to the first to fourth embodiments.

Figure 8A:
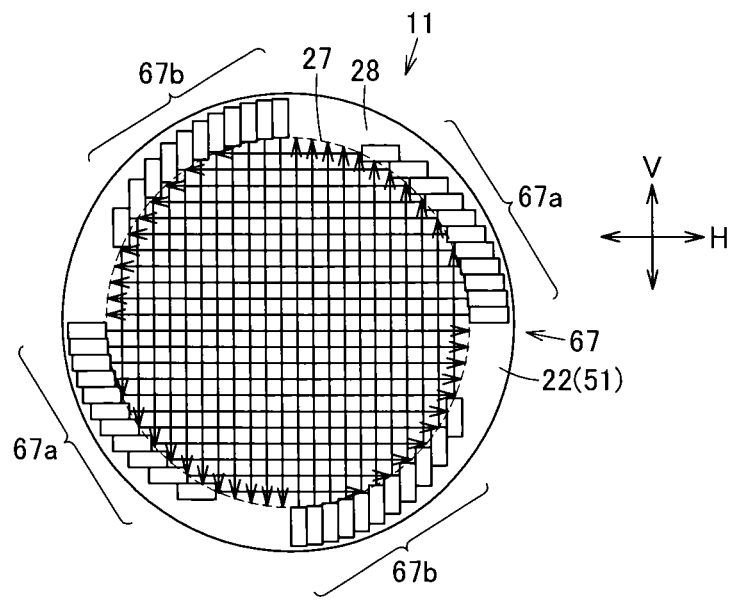
FIG. 8A and FIG. 8B show a display device according to a seventh embodiment, FIG. 8A being a plan view on the display side and FIG. 8B being a plan view on the side opposite to the display side.
Figure 8B:
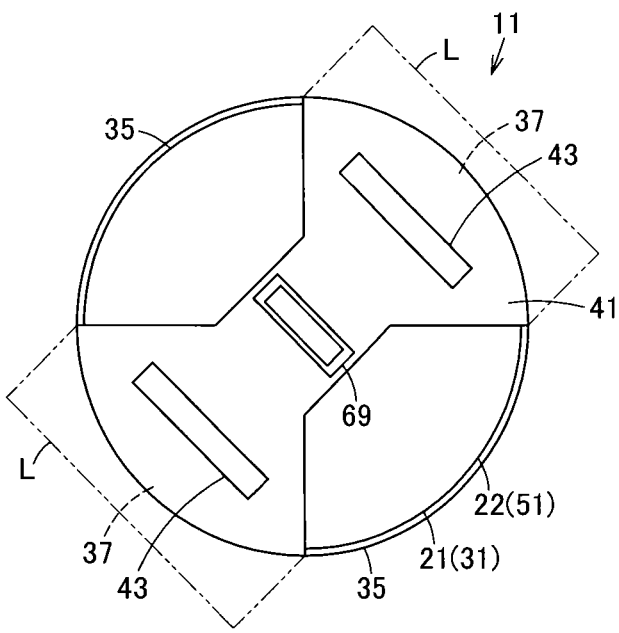

Next will be described a seventh embodiment with reference to FIG. 8A and FIG. 8B. In addition, arrangements and operations identical to those in the above-described embodiments are designated by the same reference numerals to omit description thereof.

The liquid crystal display device 11 according to the seventh embodiment has a circular shape having a circular display area 27 in which the array substrate 21 (glass substrate 31) and the counter substrate 22 (glass substrate 51) of the above-described embodiments are formed in a circular shape in a plan view. Although this embodiment is described based on the arrangement that the array substrate 21 is disposed on the rear side (back side), while the counter substrate 22 is disposed on the front side (display side), the array substrate 21 may be disposed on the front side (display side), while the counter substrate 22 maybe disposed on the rear side (back side) as in the first embodiment.

On the array substrate 21, multiple driver circuit block portions 67 for driving of each thin film transistor 34 (each secondary pixel P) are disposed in an annular frame portion 28 positioned on the periphery of the display area 27. The driver circuit block portions 67 are disposed in, for example, circumferentially and approximately quartered areas of the array substrate 21 (glass substrate 31) such that scanning line driver circuit block portions 67a for switching control of each thin film transistor 34 via the scanning line 32 and signal line driver circuit block portions 67b for sending an image signal to each thin film transistor 34 via the signal line 33 are arranged alternately in the circumferential direction.

The scanning line driver circuit block portions 67a are each arranged horizontally (H) along the outer edge of the display area 27, while the signal line driver circuit block portions 67b are each arranged vertically (V) along the outer edge of the display area 27.

Also, the outline (outside diameter) of the array substrate 21 (glass substrate 31) positioned on the rear side is set smaller than that of the counter substrate 22 (glass substrate 51) positioned on the display side. Further, the array substrate 21 and the counter substrate 22 are arranged approximately concentrically with each other. Accordingly, a non-opposed portion 35 not opposed to the array substrate 21 is formed in the outer edge portion of the counter substrate 22 and, in the non-opposed portion 35, a connecting portion 37 is formed, and the both end portions of the FPC 41 are electrically and mechanically connected to the connecting portion 37, as is the case in the above-described embodiments, and the connecting portion 37 is arranged in the radial direction such that the portion between the both end portions extends inward (toward the center).

The FPC 41 is formed in an hourglass shape in which the both end portions are each formed in an arc shape along, for example, the outer edge portion of the counter substrate 22 (glass substrate 51) and the width becomes narrowed gradually toward the central portion. The both end portions are electrically and mechanically connected with the connecting portion 37 at the position on the back side corresponding to the signal line driver circuit block portions 67b. On the FPC 41, drive circuits 43 and 43 are also mounted and, in the central portion, for example, a connector portion 69 is mounted to be electrically connected with, for example, an external signal source and a voltage source. The driver circuit block portions 67 are then electrically connected with the drive circuits 43 and 43 and the connector portion 69 via the FPC 41 so that a signal and a voltage are transmitted from the external signal source and the voltage source to the driver circuit block portions 67.

Also in the circular liquid crystal display device 11, since the end portions of the FPC 41 are thus connected to the connecting portion 37 formed at the position of the counter substrate 22 not opposed to the array substrate 21 and opposite to the display side, no linear portion could occur as in, for example, the conventional case where the FPC is connected on the display side and folded to the opposite side (as indicated by the imaginary line L), whereby the outline (outside diameter) can be reduced significantly.

In addition, in the seventh embodiment, the array substrate 21 and the counter substrate 22 may each have a polygonal shape with five or more corners to exhibit the same operational effects.

Figure 9:
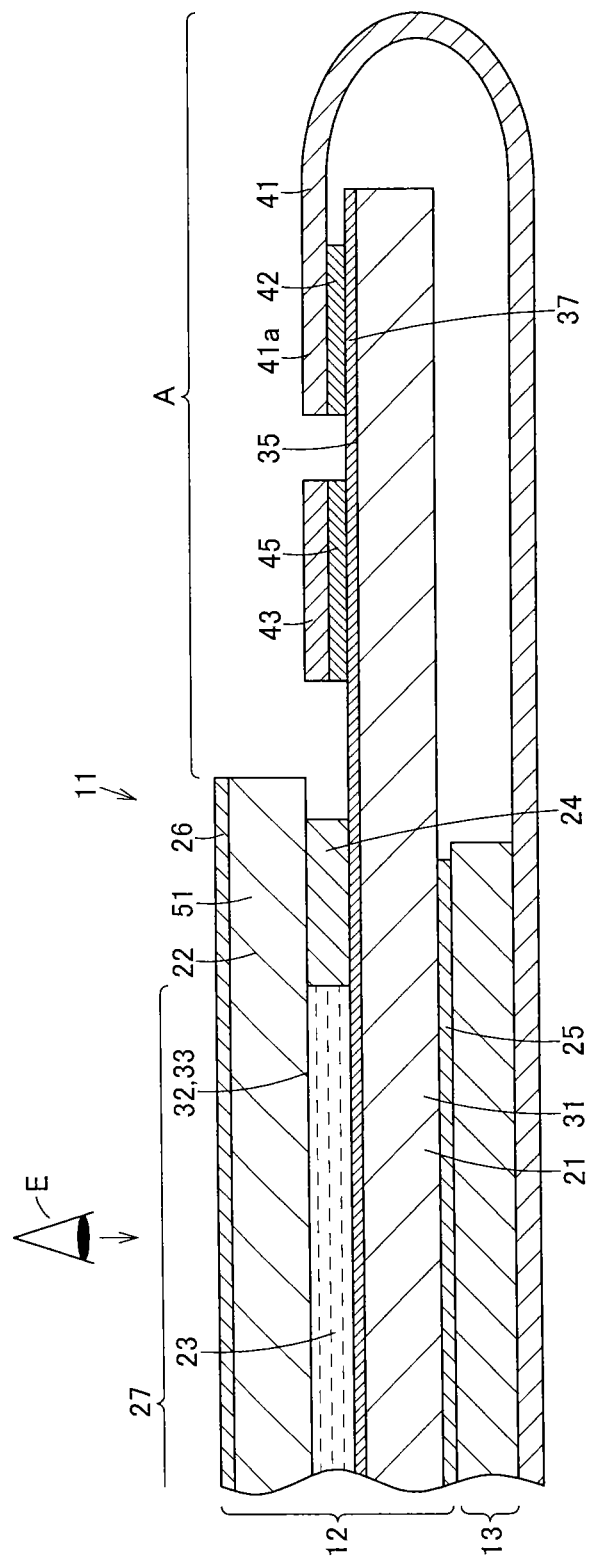
FIG. 9 is a cross-sectional view partially showing a display device according to a conventional example.

In accordance with at least one of the above-described embodiments, in the liquid crystal display device 11 having a cell structure in which the substrates 21 and 22 are opposed and bonded to each other, the array substrate 21 or the counter substrate 22 positioned on the display side has an outline larger than that of the counter substrate 22 or the array substrate 21, and at least one end portion of the FPC 41 is connected to the connecting portion 37, which is provided in the non-opposed portion 35 exposed in a view on the side opposite to the display side, such that the other end portion side extends inward, that is, toward the side not to protrude from the outer rim of the liquid crystal display device 11 (LCD panel 12 (substrates 21 and 22)). As a result, compared to the structure in which the FPC 41 is folded on the back side of the array substrate 21 and laid on the backlight 13 as in the conventional example shown in FIG. 9, the folded portion of the FPC 41 protruding outward from the array substrate 21 (or the counter substrate 22) can be removed and thereby no additional space is required for the FPC 41, whereby the area of the connecting portion 37 and the non-opposed portion 35, that is, the external signal interfacing area A can be reduced significantly and the structure of the liquid crystal display device 11 on the display side becomes flat, that is, planar and uniform, which places no restriction on the application of a functional member such as a protective glass or a touch panel for incorporation into other devices, that is, other device sets, resulting in a significant improvement in the degree of freedom of design. It is therefore possible for the liquid crystal display device 11 to have a smaller size and better design.

While a certain embodiment of the present invention has heretofore been described, the embodiment has been presented by way of example only and is not intended to limit the scope of the invention. For example, the display device may be an organic EL display device and the like, in place of the liquid crystal display device. Indeed, the novel embodiment described herein may be embodied in a variety of other forms; furthermore, various omissions, substitutions, and variations may be made without departing from the spirit of the invention. The appended claims and their equivalents are intended to cover the embodiment and its modifications as would fall within the scope and spirit of the invention.

What is claimed is:

1. A display device comprising:
a first substrate including a plurality of drive elements for pixel driving;
a second substrate disposed on a display side of the first substrate;
a signal transmission member on which a drive circuit is mounted, the drive circuit being arranged to transmit an external signal for driving of the drive elements; and a printed circuit board on which a light source is mounted and which is disposed along a normal direction with respect to one of the first substrate and the second substrate, wherein one of the first substrate and the second substrate has an outline larger than that of the other, and includes a connecting portion at a position not opposed to the other, and wherein at least one end portion of the signal transmission member is connected to the connecting portion, while the other end portion side extends inward.

2. The display device according to claim 1, wherein the connecting portion is constituted by an interconnection structure formed in the same process as part of the drive elements.

3. The display device according to claim 1, further comprising a signal interfacing unit provided between the first substrate and the second substrate to transmit a signal between the first substrate and the second substrate.

4. The display device according to claim 1, wherein the drive elements are thin film transistors.

5. The display device according to claim 1, wherein the signal transmission member is a flexible printed circuit board.

6. The display device according to claim 1, comprising a light guide plate disposed on the side opposite to the display side of the first substrate.

7. The display device according to claim 6, wherein the light source is dispose in a manner opposed to one end of the light guide plate.

8. The display device according to claim 1, wherein the light source is an LED.

9. The display device according to claim 1, wherein the other end portion of the signal transmission member is fixed to a side opposite to the display side of the first substrate.

* * * * *